United States Patent Office 3,026,313
Patented Mar. 20, 1962

3,026,313
PREPARATION OF CIS 1,4 POLYISOPRENE
William M. Saltman, Akron, Ohio, assignor to The Goodyear Tire & Rubber Company, Akron, Ohio, a corporation of Ohio
No Drawing. Filed Nov. 6, 1958, Ser. No. 772,170
6 Claims. (Cl. 260—94.3)

This invention relates to the addition polymerization of isoprene. It also relates to new methods of preparing catalyst useful to polymerize isoprene. More specifically it relates to new methods to prepare cis 1,4 polyisoprene and to methods of preparing catalysts useful for this purpose.

It is known that certain organometallic compounds are capable of producing a pronounced directive effect upon the manner in which monomeric isoprene molecules polymerize. That is to say, certain organo-metallic compounds alone or in mixtures with other metal compounds when used as catalysts cause isoprene molecules to add to each other in a specific manner to form polyisoprene possessing essentially an all cis 1,4 or trans 1,4 structure. Polyisoprene having essentially an all cis 1,4 structure has proved very interesting in that it is analogous to natural Hevea rubber not only in structure but in its properties as well. For instance, it is known that when a catalyst comprising a suspension, in an inert solvent such as heptane, of a mixture of a metal alkyl such as aluminum triethyl or aluminum triisobutyl and a metal halide such as titanium tetrachloride in amounts such that the mol ratios of aluminum to titanium (Al/Ti) ranges from about 1/1 to less than 2/1, is used to polymerize isoprene, a polyisoprene possessing essentially an all cis 1,4 structure is formed. However, if a mol ratio of Al/Ti is used that is 2.0/1 or above, little or no rubbery polymer is formed. If, on the other hand, a mol ratio lower than about 0.67/1 is used, the polyisoprene formed is not the desirable cis 1,4 structure but has mixed cis 1,4, trans 1,4 and 3,4 structures.

It is, therefore, the object of this invention to provide a method to improve isoprene polymerization. Another object is to provide a method whereby the mol ratio of Al/Ti may be extended over a wider and different range and still the desired cis 1,4 polyisoprene be formed. Another object is to provide a method whereby the molecular weight of the cis 1,4 polyisoprene formed is increased. Other objects will appear as the description proceeds.

The objects of this invention are accomplished by polymerizing isoprene in the presence of a catalyst system comprising the hydrocarbon-insoluble reaction product of the reaction between an aluminum alkyl and titanium tetrachloride wherein the mol ratio of Al/Ti is at least 2/1.

Generally, to form polyisoprene which has a high cis 1,4 structure, according to the practice of this invention, the isoprene is polymerized in the presence of the catalyst system comprising the hydrocarbon-insoluble reaction product of a mixture of aluminum alkyl and titanium tetrachloride wherein the mol ratio of Al/Ti is at least 2/1. The isoprene is usually dissolved in an inert solvent or diluent while being polymerized. The isoprene may be polymerized also in the absence of any solvent or diluent. The term inert solvent or diluent as used indicates that the solvent or diluent does not adversely affect the properties of the polymer nor does it enter into the structure of the resulting polymer. Examples of inert solvents or diluents useful for this purpose are pentane, hexane, heptane, benzene, xylene, toluene and the like. The solvent/monomer ratio employed is not critical and may be varied over wide ranges from zero (bulk polymerization) up to 20/1. However, it is preferred to utilize a solvent/monomer ratio ranging from about 3/1 to 4/1. The temperature employed in the polymerization may vary from a very low temperature such as 0° C. to a high of 90° C. or above. However, a temperature of about 50° C. is preferred. The polymerization of isoprene by means of this catalyst system requires that moisture-free and air-free techniques which are well known to the art be employed to prevent deterioration of the catalyst activity. The order of addition of reactants to the polymerization vessel is not important but usually the solvent and isoprene are added first and then the catalyst as a suspension in an inert solvent is added.

The hydrocarbon-insoluble reaction product which is the catalyst system employed in the practice of this invention is readily prepared by allowing the required amount of aluminum alkyl to react with the required amount of titanium tetrachloride usually in the presence of an inert solvent or diluent and separating the hydrocarbon-insoluble reaction product thus formed. The amounts of aluminum alkyl and titanium tetrachloride used to form the hydrocarbon-insoluble reaction product must be adjusted to give an Al/Ti mol ratio of at least 2/1. It has been found that at least a 2/1 mol ratio of Al/Ti is required to form an operative catalyst and that while the catalyst is operative when formed at mol ratios of greater than 4/1 mol ratios, it is desirable to utilize mol ratios of Al/Ti of from 2/1 to about 4/1 for best results consistent with economical practices.

Since both the aluminum alkyl and titanium tetrachloride are soluble in certain inert diluents or solvents, a convenient method of reacting is to mix solutions of each of the components in these inert solvents or diluents and allow the reaction to proceed. Examples of suitable inert diluents are aliphatic hydrocarbons such as pentane, hexane, heptane and the like or aromatic hydrocarbons such as benzene, toluene and xylene and the like or mixtures of these hydrocarbons.

The mixing and reacting of the two components to form the hydrocarbon-insoluble reaction product is usually carried out using well known oxygen- and moisture-free techniques as oxygen and moisture tend to deteriorate these materials. The mixing may occur in any solvent concentration, but to minimize errors and control the vigorous heat evolution, dilute solutions are employed. When an aluminum alkyl is reacted with titanium tetrachloride both a hydrocarbon-insoluble reaction product and a hydrocarbon-soluble reaction product is formed quite rapidly. It is this hydrocarbon-insoluble portion resulting from the reaction of aluminum alkyls and titanium tetrachloride which is useful as the catalyst in this invention. This hydrocarbon-insoluble reaction product is usually in the form of a blackish brown precipitate. It is recovered or isolated from the hydrocarbon-soluble reaction product by filtering or centrifuging the mixture and removing all the solvent, thus removing the hydrocarbon-soluble reaction product of aluminum alkyls and titanium tetrachloride. The solid precipitate is washed with fresh solvent until all the liquid phase of the original mixture is removed. This solid hydrocarbon-insoluble reaction product is usually redispersed in fresh solvent for ease of use as a catalyst. The time and temperature of reaction of these two components has not been found to be important but for convenience a time of one hour and a temperature such as room temperature has been used.

The aluminum alkyls useful to prepare the catalyst of this invention may be any aluminum alkyl such as aluminum triethyl, aluminum tripropyl, aluminum triisobutyl, aluminum trioctyl and the like. Of these, aluminum triisobutyl is preferred.

In general, the amount of hydrocarbon-insoluble reaction product of an aluminum alkyl and titanium tetrachloride used as the catalyst in the practice of this invention may vary from a minor catalytic amount such as 0.1 to a large excess such as 20 parts of catalyst per 100 parts of monomer by weight. However, it is preferred to use from about 0.25 to 4 parts catalyst per 100 parts of monomer by weight.

This invention is further illustrated by the following examples which are representative rather than restrictive of the scope of this invention.

In the following examples all experiments were conducted in clean, dry, 4-ounce, screw capped bottles, utilizing well known air-free and moisture-free techniques. In each of the examples the monomer consisted of 20 milliliters of refined and purified isoprene (13.6 grams). The isoprene was dissolved in 80 milliliters of distilled and dried heptane as an inert diluent. Unless otherwise noted, the time of polymerization was 17 hours and the temperature was 50° C. The polymers formed were processed in accordance with usual practices, i.e. alcohol coagulation, the addition of anti-oxidants and air-drying.

The results of these examples are reported in terms of polymer produced thereby. Yield is reported in percent of original monomer converted into solid polymer. Dilute solution viscosity (D.S.V.) is reported as a value obtained on a 0.1% by weight solution of polymer in benzene. Dilute solution viscosity is an indication of molecular weight, usually the higher the D.S.V. the higher the molecular weight (all other parameters such as the polymer/solvent relationship being equal). Where the structure of the polymer is reported, it is reported as being predominantly cis 1,4 polyisoprene or that the infrared spectrum was similar to that of known cis 1,4 polyisoprene and was determined by well known infrared spectrometer techniques. The specific amounts of catalyst used in each example are reported in parts by weight per 100 parts of monomeric isoprene used (p.h.m.).

*Example 1*

A catalyst was prepared as follows: a 16 milliliter portion of 0.323 molar triisobutyl aluminum in heptane was mixed with 8 milliliters of 0.323 molar titanium tetrachloride in heptane and allowed to react for one hour at room temperature. This corresponds to an Al/Ti molar ratio of 2/1. To isolate the hydrocarbon-insoluble precipitate that formed the reaction mixture was centrifuged and the liquid phase removed. The solid cake of precipitate was broken up and shaken with a volume of fresh heptane equal to that which was removed. Again, the mixture was centrifuged, the liquid phase removed, and the hydrocarbon-insoluble reaction product again shaken with a volume of fresh heptane equal to that removed. This procedure was repeated three more times to remove any trace of the original liquid phase. Again, the precipitate was redispersed in 24 milliliters of fresh heptane for ease of use as a catalyst.

A three-milliliter portion of the dispersion of hydrocarbon insoluble-reaction product was used as the catalyst to polymerize isoprene. This corresponds to 0.40 p.h.m. of catalyst. This experiment resulted in a 25.7% elastomeric polymer yield having a D.S.V. of 3.2. Upon infrared examination, it was determined that this polymer was predominantly cis 1,4 polyisoprene.

*Example 2*

A catalyst was prepared as follows: An 18 milliliter portion of 0.323 molar triisobutyl aluminum in heptane was mixed with 6 milliliters of 0.323 molar titanium tetrachloride in heptane and allowed to react for one hour at room temperature. This corresponds to an Al/Ti ratio of 3/1. To isolate the hydrocarbon-insoluble precipitate that formed the mixture was centrifuged and the liquid phase removed. The solid cake of precipitate was broken up and shaken with a volume of fresh heptane equal to that which was removed. Again, the mixture was centrifuged, the liquid phase removed and the hydrocarbon-insoluble reaction product was again shaken with a volume of fresh heptane equal to that removed. This procedure was repeated three more times to remove any trace of the original liquid phase. Again, the precipitate was redispersed in 24 milliliters of fresh heptane for ease of use as a catalyst.

A four-milliliter portion of this dispersion was used to polymerize 13.6 grams of isoprene. This corresponds to 0.44 p.h.m. of catalyst. This experiment resulted in a 5.2% yield of a polymer having a D.S.V. of 4.9. Upon infrared examination it was determined that this polymer was a high cis 1,4 polyisoprene.

*Example 3*

To compare the prior art catalyst systems with the catalyst system of this invention when used to polymerize isoprene, the following experiment was conducted:

A one milliliter portion of 0.323 molar titanium tetrachloride in heptane and a 2 milliliter portion of 0.323 molar aluminum triisobutyl in heptane were used to polymerize 20 milliliters of isoprene. In this example the mixture of aluminum triisobutyl and titanium was used as the catalyst and the hydrocarbon-insoluble product was not separated from the hydrocarbon-soluble portion prior to its being used as the catalyst. This catalyst corresponds to an Al/Ti mol ratio of 2/1 and 1.39 p.h.m. of catalyst. This experiment resulted in a yield of 0.8% of an elastomeric polymer. No dilute solution viscosity measurements or infrared analysis was made of this polymer because of the low yield. The much higher p.h.m. of the prior art catalyst compared with the separated catalyst (both starting with equal amounts of titanium tetrachloride) indicates the large and apparently deleterious amount of material in the hydrocarbon-soluble portion.

*Example 4*

To compare the prior art catalyst system with the catalyst system of this invention used in Example 2, the following experiment was conducted. A mixture of 1 milliliter of 0.323 molor titanium tetrachloride solution in heptane and 3 milliliters of 0.323 molar aluminum triisobutyl in heptane were used to polymerize 20 milliliters of isoprene in a manner similar to that of Example 3 where the hydrocarbon-soluble portion was not removed. These amounts correspond to an Al/Ti ratio of 3/1 and a 1.86 p.h.m. In this experiment no polymer whatsoever was recovered.

From the results obtained in the above examples it can readily be seen that the catalyst of this invention exhibits a great improvement over catalyst of the prior art. For instance, in Examples 1 and 2, the percent polymer yield was 25.7% and 5.2% respectfully, whereas, the controls or prior art processes, as illustrated by Examples 3 and 4, exhibit polymer yields of 0.8 and 0 respectively. It should be further noted that the dilute solution viscosity of the polymer obtained as the result of Examples 1 and 2 both exhibit a D.S.V. above 3 which is well within the range of the D.S.V. of natural hevea rubber. It should be further noted that both Examples 1 and 2 produced polymers having a high cis 1,4 structure. That the range of the mol ratio of Al/Ti above 2/1 can be used to prepare cis 1,4 polyisoprene by using the catalyst of this invention is thus illustrated.

Other experiments may be conducted using catalyst prepared from different aluminum alkyls such as aluminum triethyl, aluminum tripropyl, aluminum trimethyl and aluminum trioctyl and titanium tetrachloride, utilizing amounts so that the mol ratio of Al/Ti ranges from 2/1 to 4/1, in a manner similar to Examples 1 and 2. In addition to other catalyst being employed, other amounts of catalyst may be employed as well as other diluents and diluent/monomer ratios as described elsewhere. Other times and temperatures of polymerization may be employed so long as the general techniques set forth in this application are followed. All of these variations will tend to produce polymers having a high cis 1,4 structure as well as a high molecular weight. The choice of each of these factors is within the skill of a polymerization chemist.

While certain representative embodiments and details have been shown for the purpose of illustrating the invention, it will be apparent to those skilled in the art that various changes and modifications may be made therein without departing from the spirit or scope of the invention.

What is claimed is:

1. The method for preparing polyisoprene which comprises polymerizing isoprene to form cis-1,4 polyisoprene by means of a catalyst consisting of a hydrocarbon insoluble reaction product of an aluminum alkyl and titanium tetrachloride wherein the mol ratio of Al/Ti is at least 2/1.

2. The method according to claim 1 in which the aluminum alkyl is aluminum triisobutyl.

3. The method for preparing polyisoprene which comprises polymerizing isoprene to form cis-1,4 polyisoprene by means of a catalyst system consisting of the hydrocarbon insoluble reaction product of a mixture of an aluminum alkyl and titanium tetrachloride wherein the mol ratio of Al/Ti is at least 2/1 and not more than 4/1.

4. The method according to claim 3 in which the aluminum alkyl is aluminum triisobutyl.

5. The method of preparing polyisoprene which comprises polymerizing isoprene to form cis-1,4 polyisoprene by means of a catalyst consisting of a hydrocarbon insoluble reaction product of an aluminum alkyl and titanium tetrachloride wherein the mol ratio of Al/Ti is at least 2/1 and not more than 4/1, said polymerization being conducted while the isoprene is dissolved in an inert diluent.

6. The method according to claim 5 in which the aluminum alkyl is aluminum triisobutyl.

References Cited in the file of this patent

UNITED STATES PATENTS

| | | |
|---|---|---|
| 2,832,759 | Nowlin et al. | Apr. 29, 1958 |
| 2,882,264 | Barnes et al. | Apr. 14, 1959 |
| 2,943,063 | Eby | June 28, 1960 |

FOREIGN PATENTS

| | | |
|---|---|---|
| 526,101 | Italy | May 14, 1955 |
| 543,292 | Belgium | June 2, 1956 |
| 546,846 | Belgium | Oct. 7, 1956 |
| 215,043 | Australia | Nov. 1, 1956 |
| 789,781 | Great Britain | Jan. 29, 1958 |